(12) United States Patent
Kawata et al.

(10) Patent No.: US 10,371,230 B2
(45) Date of Patent: Aug. 6, 2019

(54) DAMPING APPARATUS

(71) Applicant: KAWATATEC CORP., Nara (JP)

(72) Inventors: Masahiro Kawata, Nara (JP); Takeshi Harada, Nara (JP); Takuya Matsumoto, Nara (JP); Yutaka Kurita, Shiga (JP); Hirotaka Tanabe, Shiga (JP); Yasunori Oura, Shiga (JP); Takashi Tanaka, Shiga (JP)

(73) Assignee: KAWATATEC CORP., Nara (JP)

( * ) Notice: Subject to any disclaimer, the term of this patent is extended or adjusted under 35 U.S.C. 154(b) by 121 days.

(21) Appl. No.: 15/407,518

(22) Filed: Jan. 17, 2017

(65) Prior Publication Data
US 2017/0292584 A1 Oct. 12, 2017

(30) Foreign Application Priority Data

Apr. 11, 2016 (JP) ................... 2016-078865

(51) Int. Cl.
*F16F 15/00* (2006.01)
*F16F 15/129* (2006.01)
(Continued)

(52) U.S. Cl.
CPC ............ *F16F 15/129* (2013.01); *B23Q 3/065* (2013.01); *B23Q 11/0032* (2013.01); *F16F 7/00* (2013.01); *F16F 15/073* (2013.01); *F16F 15/1201* (2013.01); *F16F 15/1207* (2013.01); *B23Q 2240/005* (2013.01)

(58) Field of Classification Search
CPC ... B23B 31/08; B23B 31/1173; B23B 31/117; B23B 31/32; B23B 2250/16; B23B 2260/032; B23B 2260/068; B23B 13/123; B23Q 3/061; B23Q 11/0032; F16F 1/027; F16F 15/073; F16F 15/1201;
(Continued)

(56) References Cited

U.S. PATENT DOCUMENTS 1,799,019 A * 3/1931 Mischler ........... B23B 31/16275
269/275
3,159,389 A * 12/1964 Clary ..................... B60G 11/02
267/49

(Continued)

FOREIGN PATENT DOCUMENTS

JP 2012187688 A 10/2012
JP 2015014312 A 1/2015

*Primary Examiner* — Nicholas J Lane
(74) *Attorney, Agent, or Firm* — Miller, Matthias & Hull LLP (57) ABSTRACT

A damping apparatus includes a damping unit 30 composed of a plurality of damping plates 36 having plasticity, a holding member 31 holding at least one ends of the damping plates 36 in a manner to allow deflection of the damping plates 36 with the damping plates 36 laminated together, and a contact member 33 provided at a position spaced from a holding position of the holding member 31, and attached to an outermost one of the damping plates 36, or extending through and held by the damping plates 36 in such a manner that it can be brought into contact with the outermost one of the damping plates 36 and can be moved in an extending direction thereof. The damping unit 30 is supported by a support mechanism 2 in such a manner that the contact member 33 can be brought into contact with an object W.

1 Claim, 8 Drawing Sheets

(51) Int. Cl.
*B23Q 3/06* (2006.01)
*F16F 7/00* (2006.01)
*F16F 15/12* (2006.01)
*B23Q 11/00* (2006.01)
*F16F 15/073* (2006.01)

(58) Field of Classification Search
CPC .. F16F 15/1207; F16F 15/121; F16F 15/1212; F16F 15/1215
USPC .............................. 279/2.14, 2.22, 23.1, 46.7
See application file for complete search history.

(56) References Cited

U.S. PATENT DOCUMENTS

| | | | | |
|---|---|---|---|---|
| 3,682,467 | A * | 8/1972 | Heinrich | B25B 5/142 269/137 |
| 5,738,445 | A * | 4/1998 | Gardner | F01D 25/164 384/119 |
| 8,834,027 | B2 * | 9/2014 | Zeidan | F16F 15/1215 384/117 |
| 2011/0193282 | A1 * | 8/2011 | Phillips | B25B 5/06 269/317 |
| 2012/0018940 | A1 * | 1/2012 | Kumnig | H01L 21/68728 269/225 |
| 2012/0168271 | A1 * | 7/2012 | Ryaboy | F16F 7/116 188/379 |
| 2015/0209872 | A1 * | 7/2015 | Chang | B23B 31/32 279/139 |
| 2017/0291225 | A1 * | 10/2017 | Yamamoto | B23B 31/1173 |

* cited by examiner

DAMPING APPARATUS

FIELD OF THE DISCLOSURE

The present disclosure relates to a damping apparatus that damps vibration of a vibrating object in a state of being in contact with the object.

BACKGROUND OF THE DISCLOSURE

For example, it has been widely known that, when a thin-walled workpiece is cut with a machine tool, there is a problem that chatter vibration occurs on the workpiece due to cutting resistance, and there has been proposed a chuck device which is capable of suppressing such chatter vibration when turning is performed on a thin-walled workpiece, which chuck device is disclosed in Japanese Unexamined Patent Application Publication No. 2012-187688.

This chuck device includes a table and a plurality of clamping means disposed radially on the table, and each clamping means is composed of a first contact means and a second contact means, which are disposed to face each other, and a coupling unit that couples the first contact means with the second contact means. Further, the first contact means includes a pad that is brought into contact with the workpiece, and a bolt that moves the pad toward and away from the workpiece.

When using this chuck device, first, a hollow, cylindrical workpiece is inserted between the first contact means and second contact means of each clamping means. Thereafter, each clamping means is moved outward in a radial direction of the table to bring the second contact means into contact with an inner surface of the workpiece. Subsequently, the bolt of each first contact means is rotated to bring the pad into light contact with an outer surface of the workpiece, and then the workpiece is centered. After the centering, each bolt is further rotated to cause the workpiece to be clamped by the pad and the second contact means. After the workpiece is thus clamped, each clamping means is fixed to a top surface of the table.

Thus, according to this chuck device, because a wall thickness portion of a workpiece is clamped by the first contact means and the second contact means and each clamping means is pressed on and fixed to the top surface of the table, stress and distortion occurring on the workpiece can be minimized, and consequently chatter vibration can be prevented.

However, although the above-described conventional chuck device might be capable of suppressing chatter vibration occurring on a hollow, cylindrical workpiece having a relatively short length, the chuck device cannot exhibit a sufficient damping effect for a hollow, cylindrical workpiece having a long length, because of its configuration.

That is, because the above-described conventional chuck device is configured to clamp an end portion of a workpiece, in the case of a workpiece having a long length, the non-clamped end of the workpiece has a high degree of freedom. Therefore, self-excited vibration is likely to occur, that is, chatter vibration is likely to occur.

Accordingly, in view of this problem, the present applicant has already proposed a damping apparatus disclosed in Japanese Unexamined Patent Application Publication No. 2015-14312.

This damping apparatus is attached around a cylindrical member having a hollow shape to damp vibration of the cylindrical member, and is configured to include a plurality of belt-shaped damping plates that have plasticity and are wounded around the cylindrical member in a state of being laminated together, and a binding band that comprises a band-shaped member having plasticity and is wounded around the plurality of damping plates for binding them together.

According to this damping apparatus, because the damping plates having plasticity are wounded around the cylindrical member and the damping plates are bound together by the binding band, if vibration occurs on the cylindrical member in performing turning on the cylindrical member, the vibration is propagated to the damping plates and thereby each of the damping plates is vibrated, and friction between the damping plates caused by the vibration of the damping plates absorbs the propagated vibration energy, whereby the vibration of the cylindrical member is reduced and damped.

Further, because, as described above, the damping apparatus has the configuration in which the plurality of damping plates having plasticity are wounded around the cylindrical member, the damping apparatus can be arranged at an optimum position along a longitudinal extent of the cylindrical member. Therefore, with respect to a cylindrical member having a long length or a cylindrical member whose vibration state depends on machining conditions, adjusting the arrangement position of the damping apparatus enables the vibration of the cylindrical member to be damped under an optimum state and enables optimization for suppressing chatter vibration. Further, with respect to a cylindrical member having a long length, disposing two or more damping apparatuses enables the vibration of the cylindrical member to be damped more appropriately.

SUMMARY OF THE DISCLOSURE

As described above, the present applicant has already proposed a damping apparatus which is capable of effectively suppressing occurrence of chatter vibration in performing turning on a hollow, cylindrical workpiece, regardless of the length of the workpiece.

By the way, chatter vibration caused by cutting occurs not only on a hollow, cylindrical workpiece as described above. For example, in the case of a workpiece having a thin wall portion, chatter vibration is likely to occur on the workpiece when cutting is performed on the thin wall portion, regardless of the shape of the workpiece. Further, besides such a thin-walled workpiece, there are probably other workpieces which are easily vibrated.

However, the above-described damping apparatus proposed by the present applicant can be suitably applied to a hollow and cylindrical workpiece, but has a disadvantage that it cannot be applied to a workpiece having another shape, in other words, it is dedicated and lacks versatility. Therefore, there is a desire for development of a versatile damping apparatus which is capable of suitably damping not only vibration occurring on a workpiece having a hollow, cylindrical shape as described above but also vibration occurring on a workpiece having another shape.

The present disclosure has been achieved in view of the above-described circumstances, and an object thereof is to provide a versatile damping apparatus capable of effectively suppressing vibration occurring on a workpiece regardless of the shape of the workpiece, and another object thereof is to provide a damping apparatus capable of effectively suppressing vibration occurring on a hollow, cylindrical workpiece.

The present disclosure, for solving the above-described problem, relates to a damping apparatus damping vibration of an object in a state of being in contact with the object, the damping apparatus including a damping unit,
the damping unit including:
a plurality of damping plates having plasticity;
a holding member holding at least one ends of the damping plates in a manner to allow deflection of the damping plates, with the damping plates laminated together; and
a contact member provided at a position spaced from a holding position of the holding member, the contact member being attached to an outermost one of the damping plates or extending through and being held by the damping plates in such a manner that it can be brought into contact with the outermost one of the damping plates and can be moved in an extending direction thereof, and the damping apparatus further including a support mechanism supporting the holding member in such a manner that the contact member can be brought into contact with the object.

When using this damping apparatus, first, the support mechanism is fixed as appropriate with the contact member of the damping unit pressed on a portion of an object where vibration occurs, the object being fixed as appropriate. Because, as described above, the contact member is attached to the outermost one of the damping plates, or extends through and is held by the damping plates in such a manner that it can be brought into contact with an outermost one of the damping plates, when the contact member is pressed on the object, a resultant drag brings the damping plates into close contact with each other and thereby each of the damping plates is deflected.

When vibration (including chatter vibration caused by cutting; the same applies below) occurs on the object in this state, the vibration is propagated to the plurality of damping plates through the contact member and thereby each of the damping plates is vibrated. This vibration of the damping plates is a phenomenon in which different bent (deflected) states of the damping plates repeatedly appear; therefore, slip occurs between the laminated damping plates due to differences in bending deformation and this slip produces friction between the damping plates. Further, energy of the vibration is converted into heat energy generated by the friction, whereby the vibration is reduced. Thus, the damping apparatus according to the present disclosure damps vibration of an object by friction between the damping plates.

Further, the damping apparatus has the configuration in which the damping unit is supported by the support mechanism; therefore, the damping apparatus can be disposed at any position by arranging and fixing the support mechanism at the position. Therefore, regardless of the shape of the object, the contact member can be brought into contact with an appropriate portion of the object where vibration has to be damped, which enables optimization of vibration suppression.

In the damping apparatus, the support mechanism may include a moving mechanism moving the damping unit so as to move the contact member toward and away from the object. According to this damping apparatus, the support mechanism is first disposed as appropriate near the object, and then the contact member can be moved toward the object and brought into contact with the object by operating the moving mechanism. Therefore, the damping apparatus can be easily installed.

Further, in the damping apparatus, the support mechanism may include a position adjusting mechanism adjusting a position at which the contact member is brought into contact with the object. According to this damping apparatus, by the position adjusting mechanism, the position of the contact member for bringing it into contact with the object can be adjusted to a position which allows the vibration of the object to be damped most effectively.

Further, a configuration may be employed in which the damping apparatus includes two or more damping units, and the support mechanism supports the damping units in such a manner that the damping units can be moved in a radial direction, and includes a moving mechanism moving the damping units forward and backward in the radial direction.

According to this damping apparatus, for example, in the case where the object is hollow and cylindrical, the object can be arranged so that the damping units are positioned inside the hollow, cylindrical object. In this case, each damping unit is arranged so that the contact member thereof is positioned outside in the radial direction. Subsequently, the damping units are moved outward in the radial direction by operating the moving mechanism to bring the contact members into contact with an inner peripheral surface of the object.

When vibration occurs on the object in this state due to turning performed on an outer peripheral surface of the object or the like, the vibration is propagated to the damping plates of the damping units through the contact members thereof, and the vibration occurring on the object is damped by the above-described action of the damping plates.

Further, with this damping apparatus, the object can be arranged so that the damping units are positioned outside the hollow, cylindrical object. In this case, each damping unit is arranged so that the contact member thereof is positioned inside in the radial direction. Subsequently, the damping units are moved inward in the radial direction by operating the moving mechanism to bring the contact members into contact with the outer peripheral surface of the object.

When vibration occurs on the object in this state due to turning performed on the inner peripheral surface of the object or the like, the vibration is propagated to the damping plates of the damping units through the contact members thereof, and the vibration occurring on the object is damped by the above-described action of the damping plates.

Thus, according to the damping apparatus having this configuration, vibration of a hollow, cylindrical object can be effectively damped.

Further, in the damping apparatus having this configuration, the support mechanism may further include a position adjusting mechanism moving the damping units in a direction orthogonal to the radial direction. According to this damping apparatus, by the position adjusting mechanism, the positions of the contact members for bringing them into contact with a hollow, cylindrical object can be adjusted to positions which allow the vibration of the object to be damped most effectively, in the direction orthogonal to the radial direction (that is, in an axial direction of the object).

As described above, in the damping apparatus according to the present disclosure, the support mechanism is fixed as appropriate with the contact member pressed on a portion of an object where vibration occurs; therefore, when vibration occurs on the object, the vibration is propagated to the plurality of damping plates through the contact member and thereby each of the damping plates is vibrated, and this vibration of the damping plates absorbs, reduces, and damps the vibration of the object.

Further, the damping apparatus can be disposed at any position; therefore, regardless of the shape of the object, the contact member can be brought into contact with an appropriate portion of the object where vibration has to be damped, which enables optimization of vibration suppression.

DETAILED DESCRIPTION

Hereinafter, specific embodiments of the present disclosure will be described with reference to the drawings.

Figure 1:
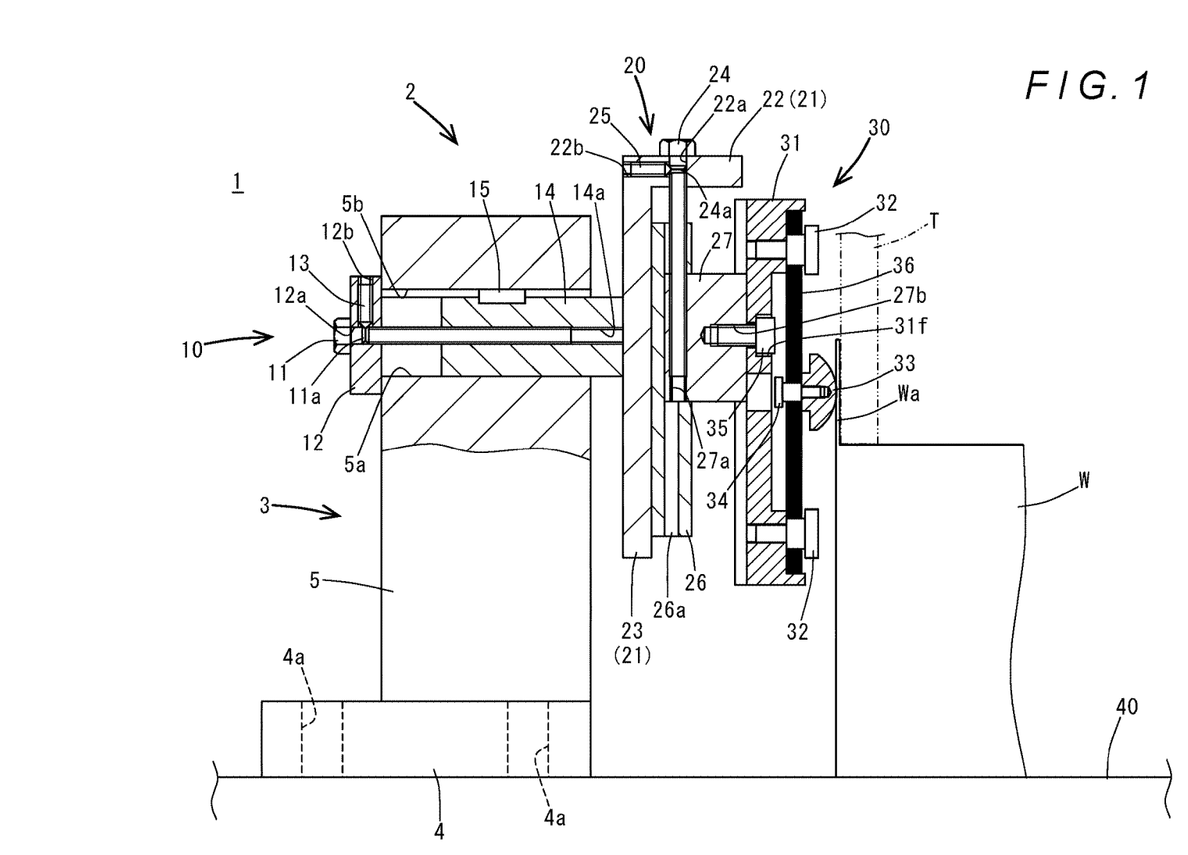
FIG. 1 is a side view of a damping apparatus according to a first embodiment of the present disclosure.

A damping apparatus according to a first embodiment of the present disclosure is described based on FIGS. 1 to 5. As shown in FIG. 1, the damping apparatus 1 according to the first embodiment is composed of a damping unit 30 and a support mechanism 2 supporting the damping unit 30.

The support mechanism 2 is composed of a support base 3 consisting of a plate-like base portion 4 and a block-like support portion 5 erected on the base portion 4, a moving mechanism 10 provided on the support portion 5 of the support base 3, and a position adjusting mechanism 20 held by the moving mechanism 10.

The support portion 5 has a through hole 5a formed therethrough, the through hole 5a extending in the right-left direction in FIG. 1 and having a key groove 5b formed thereon. Further, the base portion 4 has bolt holes 4a bored therethrough, the bolt holes 4a extending from an upper surface to a lower surface of the base portion 4 and being used to fix the base portion 4 to an appropriate table 40 or the like with attachment bolts or the like, which are not shown in the drawings.

The moving mechanism 10 is configured to include a bracket 12, a feed screw 11, a moving rod 14, and other components. The moving rod 14 has a key 15 fixed to an outer peripheral surface thereof; the moving rod 14 is fitted in the through hole 5a of the support portion 5 with the key 15 engaged with the key groove 5b and is movable in an axial direction of the through hole 5a (the right-left direction). Further, the moving rod 14 has a screw hole 14a formed in a central portion thereof, the screw hole 14a extending along a center axis of the moving rod 14.

The bracket 12 is fixed to a left side surface of the support portion 5 to close a left opening of the through hole 5a and has a though hole 12a bored therethrough, the through hole 12a extending from a right surface to a left surface of the bracket 12. The feed screw 11 is inserted through the through hole 12a and a screw portion of the feed screw 11 is screwed with the screw hole 14a formed in the moving rod 14.

Further, the bracket 12 has a screw hole 12b formed therein, the screw hole 12b extending from an upper surface to the through hole 12a of the bracket 12. A set screw 13 is screwed in the screw hole 12b and a tip end of the set screw 13 is engaged with a restraining groove 11a formed along a circumferential direction in an outer peripheral surface of the feed screw 11.

Accordingly, the engagement between the restraining groove 11a and the set screw 13 restrains the feed screw 11 from moving in an axial direction thereof (the right-left direction), and the screwing between the screw portion of the feed screw 11 and the screw hole 14a of the moving rod 14 allows the moving rod 14 to be moved in the left direction (backward direction) by rotating the feed screw 11 in a direction to screw it into the screw hole 14a, and to be moved in the right direction (forward direction) by rotating the feed screw 11 in a direction to pull it out of the screw hole 14a.

The position adjusting mechanism 20 is configured to include an angle member 21 fixed to a right end surface of the moving rod 14, a guide member 26 having a so-called T groove 26a formed thereon, a moving block 27 having an approximately T-shaped cross-section, a feed screw 24, and other components.

The angle member 21 consists of a horizontal portion 22 and a vertical portion 23 connected to the horizontal portion 22, the vertical portion 23 extending downward from a left end portion of the horizontal portion 22 and having the guide member 26 fixed to a right side surface thereof. The guide member 26 has the T groove 26a formed thereon, the T groove 26a extending in a top-bottom direction (vertical direction); the moving block 27 is engaged with the T groove 26a so as to be movable in the top-bottom direction along the T groove 26a.

Further, the horizontal portion 22 of the angle member 21 has a through hole 22a bored there through, the through hole 22a extending from an upper surface to a lower surface of the horizontal portion 22. The feed screw 24 is inserted through the through hole 22a and a screw portion of the feed screw 24 is screwed with a screw hole 27a formed along the vertical direction in the moving block 27.

The horizontal portion 22 of the angle member 21 further has a screw hole 22b formed therein, the screw hole 22b extending from a left side surface to the through hole 22a of the horizontal portion 22. A set screw 25 is screwed in the screw hole 22b and a tip end of the set screw 25 is engaged with a restraining groove 24a formed along a circumferential direction in an outer peripheral surface of the feed screw 24.

Accordingly, the engagement between the restraining groove 24a and the set screw 25 restrains the feed screw 24 from moving in an axial direction thereof (the vertical direction), and the screwing between the screw portion of the feed screw 24 and the screw hole 27a of the moving block 27 allows the moving block 27 to be moved upward by rotating the feed screw 24 in a direction to screw it into the screw hole 27a, and to be moved downward by rotating the feed screw 24 in a direction to pull it out of the screw hole 27a.

Figure 2:
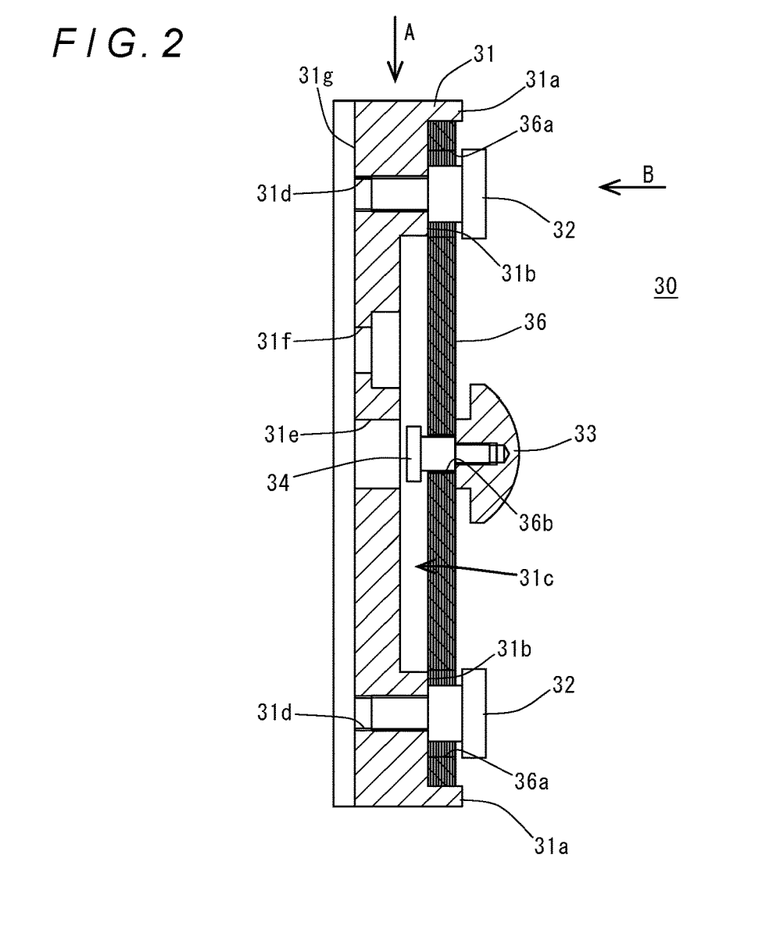
FIG. 2 is a sectional view of a damping unit according to the first embodiment.

As shown in FIGS. 1 and 2, the damping unit 30 is configured to include a plurality of damping plates 36 having plasticity, a holding member 31 holding the damping plates 36 with the damping plates 36 laminated together, and a contact member 33 held by the damping plates 36.

Figure 4:
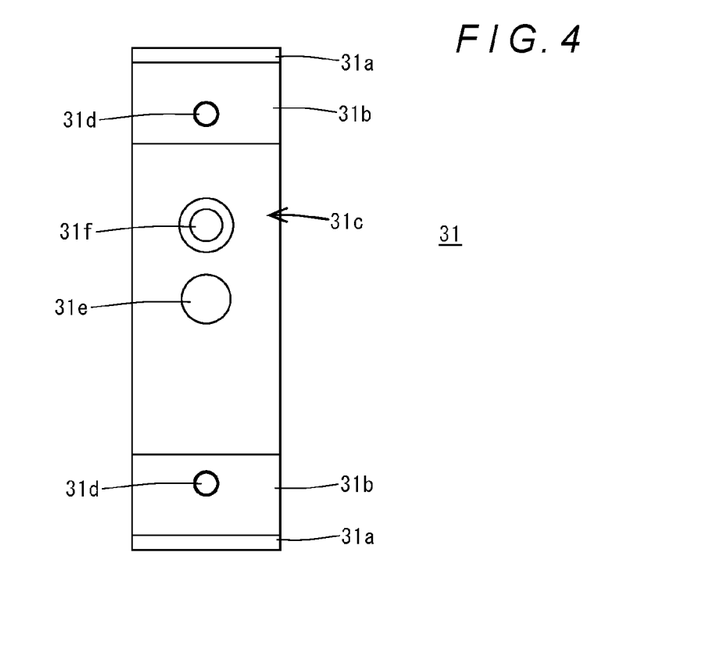
FIG. 4 is a front view of the holding member shown in FIG. 2, seen from the direction of arrow B in FIG. 2.

As shown in FIGS. 1, 2, and 4, the holding member 31 comprises a member having a stepped longitudinal cross-section, and has edge portions 31a and 31a, holding surfaces 31b and 31b, and a concave relief portion 31c formed on a right side surface thereof, the edge portions 31a and 31a protruding outward from upper and lower ends of the right side surface, the holding surfaces 31b and 31b being formed inside the edge portions 31a and 31a, and the relief portion 31c being formed between the holding surfaces 31b and 31b. The holding member 31 also has screw holes 31d and 31d formed in the holding surfaces 31b and 31b, the screw holes 31d and 31d extending from right to left through the holding member 31. The holding member 31 further has a relief hole 31e and a bolt hole 31f bored in a side surface corresponding to the relief portion 31c, the relief hole 31e being bored at the center of the side surface corresponding to the relief portion 31c and extending from right to left through the holding member 31, the bolt hole 31f being bored above the relief hole 31e and extending from right to left through the holding member 31.

Figure 3:
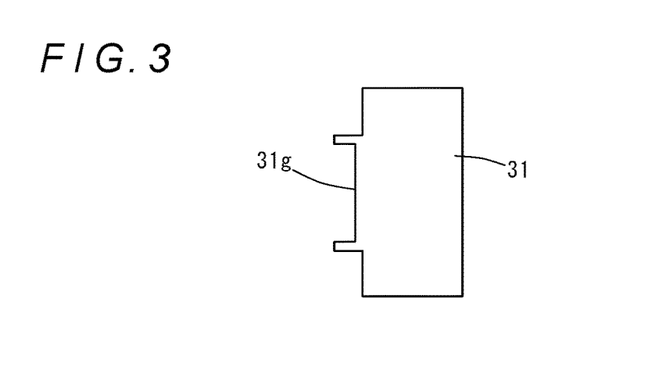
FIG. 3 is a plan view of a holding member shown in FIG. 2, seen from the direction of arrow A in FIG. 2.

Further, as shown in FIGS. 1 to 3, the holding member 31 has a groove 31g formed along the top-bottom direction (vertical direction) in a left side surface thereof; a right end portion of the moving block 27 is fitted in in the groove 31g and an attachment bolt 35 inserted through the through hole 31f of the holding member 31 is tightened in a screw hole 27b formed in the moving block 27 and having an opening in a right side surface of the moving block 27, whereby the holding member 31 is fixed to the moving block 27.

Figure 5:
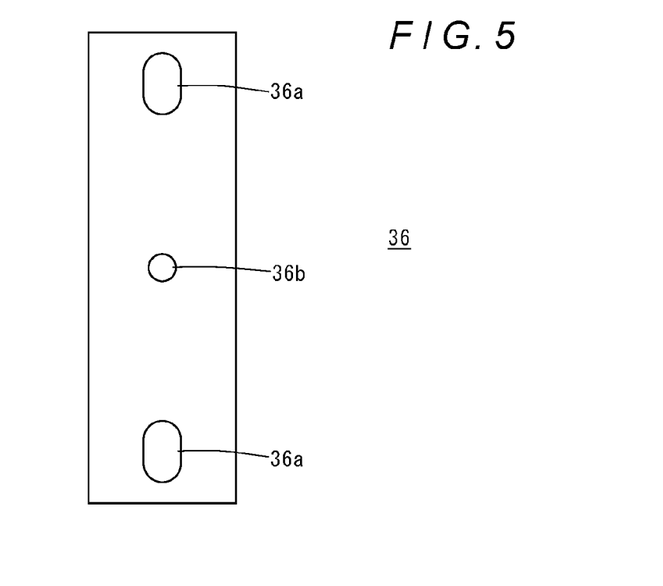
FIG. 5 is a front view of a damping plate according to the first embodiment.

As shown in FIGS. 1 and 2, the damping plates 36 are disposed between the edge portions 31a and 31a of the holding member 31, and, as further shown in FIG. 5, each damping plate 36 has slot-shaped through holes 36a and 36a bored therein at portions corresponding to the screw holes 31d and 31d formed in the holding surfaces 31b and 31b and has a through hole 36b bored through the center thereof. Further, with holding bolts 32 and 32 inserted through the through holes 36a and 36a and screwed in the screw holes 31d and 31d, the damping plates 36 are held by the holding member 31 in a state of being laminated together. Note that a clearance is formed between the outermost one of the damping plates 36 and heads of the holding bolts 32 and 32. Further, the damping plates 36 can be deflected in the right-left direction because the holding member 31 has the relief portion 31c formed thereon.

The contact member 33 comprises an approximately half-spherical member having a spherically curved surface and has a screw hole 33a formed in a surface opposite to the curved surface thereof. The contact member 33 is disposed at the right of the damping plates 36 so that the curved surface thereof is oriented rightward. A holding bolt 34 inserted through the through holes 36b of the damping plates 36 is screwed in the screw hole 33a of the contact member 33, whereby the contact member 33 is held by the damping plates 36. Note that the distance between a head of the holding bolt 34 and the contact member 33 is larger than the overall thickness of the damping plates 36.

Thus, in the damping unit 30 having the above-described configuration, the damping plates 36 are held by the holding member 31 in such a manner that they can be moved in the right-left direction, without being fastened to the holding member 31 by the holding bolts 32 and 32 and without being fastened by the contact member 33 and the holding bolt 34.

Next, a manner in which vibration of an object is damped with the damping apparatus 1 according to this embodiment having the above-described configuration is described. Note that, in this example, as shown in FIG. 1, vibration which occurs on a thin wall portion Wa of a workpiece W fixed on the table 40 of an appropriate machine tool when the thin wall portion Wa is machined by a tool T such as an end mill or the like is damped.

First, the damping apparatus 1 is fixed on the table 40 near the workpiece W so that the contact member 33 of the damping apparatus 1 can be brought into contact with the thin wall portion Wa of the workpiece W. Note that, as described above, the damping apparatus 1 is fixed on the table 40 by attachment bolts that are inserted through the bolt holes 4a formed in the base portion 4 of the support base 3 and tightened in the table 40.

Subsequently, the feed screw 11 of the moving mechanism 10 is rotated in the direction to pull it out of the screw hole 14a, whereby the moving rod 14 is moved in the forward direction and the position adjusting mechanism 20 fixed to the moving rod 14 and the damping unit 30 fixed to the moving block 27 of the position adjusting mechanism 20 are moved in the forward direction, that is, toward the workpiece W, to bring the contact member 33 of the damping unit 30 into contact with the thin wall portion Wa of the workpiece W. Accordingly, when the contact member 33 is thus pressed on the workpiece W, a resultant reaction force acts on the damping plates 36, and thereby the laminated damping plates 36 are brought into close contact with each other and each of the damping plates 36 is deflected. Note that the contact force of the contact member 33 being in contact with the workpiece W is adjusted as appropriate by the moving mechanism 10.

Further, the position of the contact member 33 in the vertical direction for bringing it into contact with the thin wall portion Wa of the workpiece W is adjusted by the position adjusting mechanism 20. That is, the position of the contact member 33 for bringing it into contact with the thin wall portion Wa of the workpiece W is adjusted by rotating the feed screw 24 in the direction to screw it into the screw hole 27a to move the moving block 27 and the damping unit 30 upward or rotating the feed screw 24 in the direction to pull it out of the screw hole 27a to move the moving block 27 and the damping unit 30 downward.

Accordingly, when the thin wall portion Wa of the workpiece W is machined by the tool T in this state and vibration (including chatter vibration) occurs on the thin wall portion Wa, the vibration is propagated to the damping plates 36 through the contact member 33 and thereby each of the damping plates 36 is vibrated. This vibration of the damping plates 36 is a phenomenon in which different bent (deflected) states of the damping plates 36 repeatedly appear; therefore, slip occurs between the laminated damping plates 36 due to differences in bending deformation and this slip produces friction between the damping plates 36. Further, energy of the vibration is converted into heat energy generated by the friction, whereby the vibration is reduced and damped.

Because of, as described above, having the configuration in which the damping unit 30 is supported by the support mechanism 2, the damping apparatus 1 can be disposed at any position by arranging and fixing the support mechanism 2 at the position. Therefore, regardless of the shape of the workpiece W, the contact member 33 of the damping unit 30 can be brought into contact with an appropriate portion of the workpiece W where vibration has to be damped, which enables optimization of vibration suppression (damping).

Further, because the damping apparatus 1 has the moving mechanism 10, the contact member 33 can be appropriately brought into contact with the workpiece W by a simple operation of operating the moving mechanism 10 after the support mechanism 2 is disposed as appropriate near the workpiece W; therefore, the damping apparatus 1 can be easily installed. Further, the moving mechanism 10 enables the contact force of the contact member 33 being in contact with the workpiece W to be easily adjusted; therefore, it is possible to optimize the damping effect of the damping apparatus 1 and, if the workpiece W is easily deflected, the contact force can be easily adjusted to an appropriate one so that deflection of the workpiece W falls within an allowable range.

Further, because this damping apparatus 1 has the position adjusting mechanism 20, by the position adjusting mechanism 20, the position of the contact member 33 in the vertical direction for bringing it into contact with the workpiece W can be easily adjusted to a position which allows the vibration of the workpiece W to be damped most effectively.

Note that, in this example, specifically, spring steel having the thickness of 0.2 mm is used as the damping plate 36 and 20 damping plates 36 are used. However, the material of the damping plates 36 is not limited thereto and naturally another material may be used. Further, the thickness of each damping plate 36 is not limited to 0.2 mm and it is determined as appropriate in accordance with the material thereof and the like, and the number of the damping plates 36 used in the damping apparatus 1 is determined as appropriate in accordance with a required damping ability.

Figure 6:
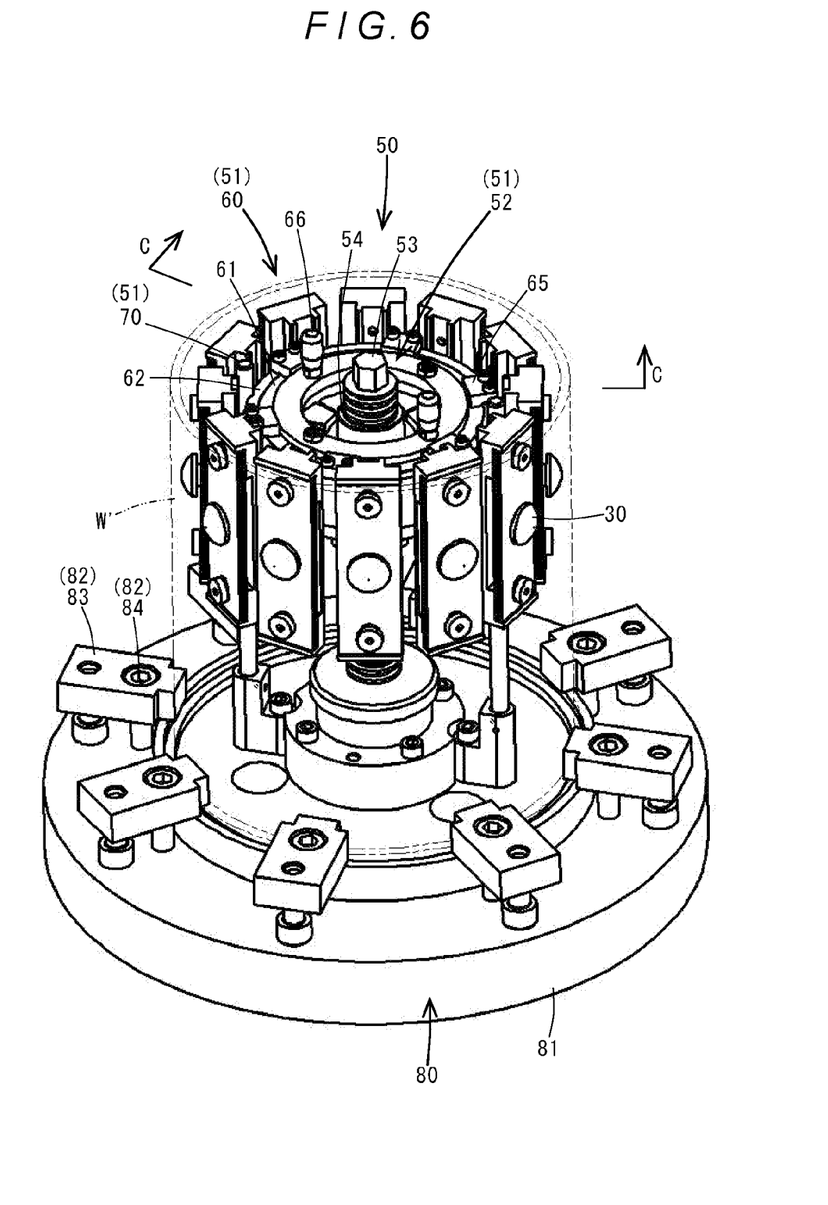
FIG. 6 is a perspective view showing a damping apparatus and a workpiece holding device according to a second embodiment of the present disclosure.
Figure 7:
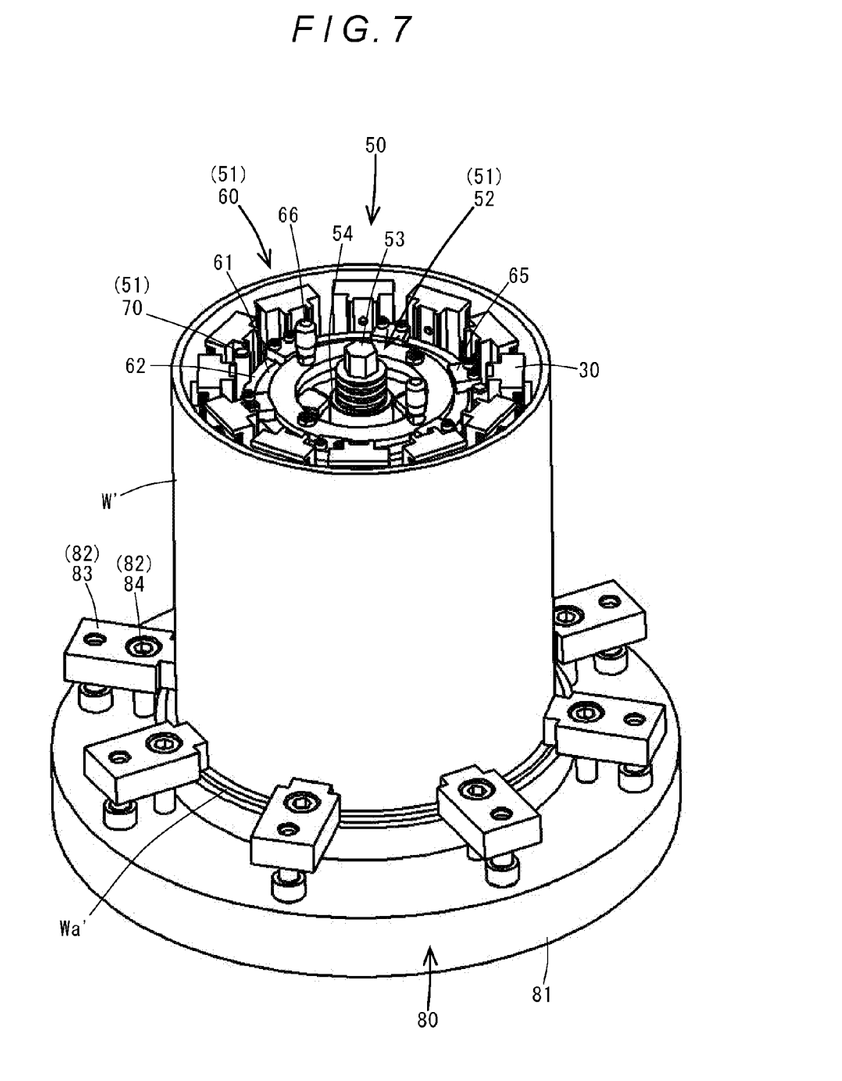
FIG. 7 is a perspective view showing an example of use of the damping apparatus and workpiece holding device according to the second embodiment.
Figure 8:
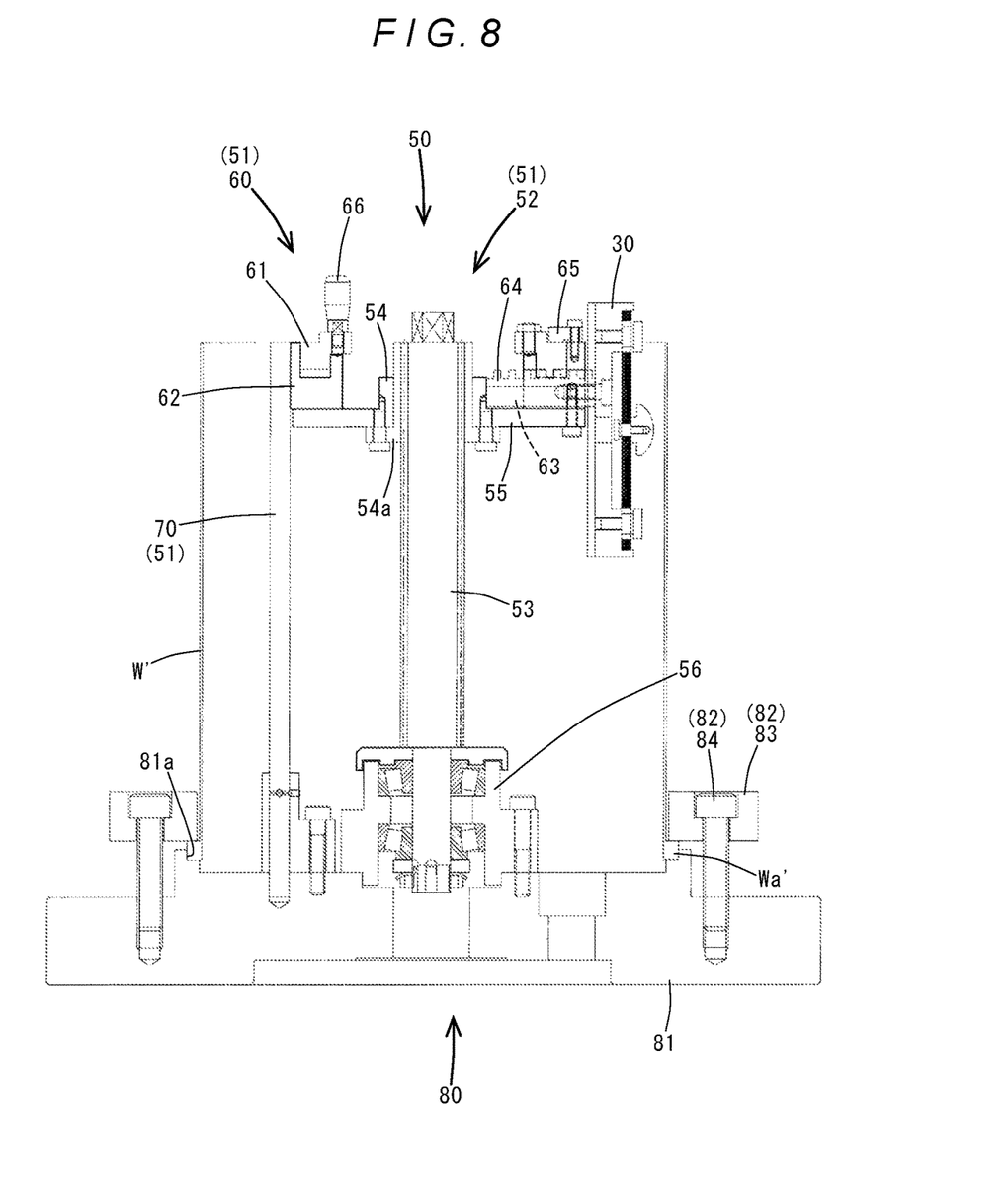
FIG. 8 is a sectional view of the damping apparatus and workpiece holding device shown in FIG. 6, taken along the line C-C in FIG. 6.

Next, a damping apparatus according to a second embodiment of the present disclosure is described based on FIGS. 6 to 9. As shown in FIGS. 6 to 8, the damping apparatus 50 according to the second embodiment is provided on a workpiece holding device 80 for holding a hollow, cylindrical workpiece W', and the workpiece holding device 80 is attached to a spindle of a vertical lathe, for example.

The workpiece holding device 80 includes a base plate 81 to be attached to the spindle of the vertical lathe, and a plurality of presser tools 82 provided around a workpiece holding hole 81a formed in the base plate 81. Note that the workpiece W' has an annular flange portion Wa' formed thereon, the flange portion Wa' protruding outward from the periphery of an lower end portion of the workpiece W; this flange portion Wa' is to be fitted in the workpiece holding hole 81a. Further, each presser tool 82 is composed of a pressing block 83 and a pressing bolt 84, and tightening the pressing bolts 84 causes the flange portion Wa' to be clamped on the base plate 81 by the pressing blocks 83.

The damping apparatus 50 is composed of a support mechanism 51 and a damping unit 30 supported by the support mechanism 51, the support mechanism being composed of a position adjusting mechanism 52, a moving mechanism 60, and auxiliary rods 70. Note that the damping unit 30 has the same configuration as in the above-described first embodiment and, in this embodiment, the components thereof are indicated by the same references as those used in the first embodiment and detailed explanation thereof is omitted.

The support mechanism 51 is disposed on the base plate 81 within the workpiece holding hole 81a, and the support mechanism 51 is positioned inside the workpiece W' when the workpiece W' is attached to the base plate 81.

The position adjusting mechanism 52 is composed of a bearing 56 disposed at the center of the base plate 81, a screw shaft 53 erected on the bearing 56, a nut 54 screwed with the screw shaft 53, and an annular support plate 55 coupled to the nut 54. The screw shaft 53 that is erected on the base plate 81 through the bearing 56 is rotatable about an axis thereof, and rotation of the screw shaft 53 causes the nut 54 screwed with the screw shaft 53 to move upward or downward along the screw shaft 53.

The nut 54 has an annular flange portion 54a formed thereon, the flange portion 54a protruding outward from the periphery of a lower end portion of the nut 54. The annular support plate 55 is fitted on the periphery of the nut 54 and attached to the flange portion 54a with screws.

Accordingly, in the position adjusting mechanism 52 having the above-described configuration, the nut 54 and the support plate 55 are moved upward or backward along the screw shaft 53 by rotating the screw shaft 53 about the axis thereof.

Figure 9:
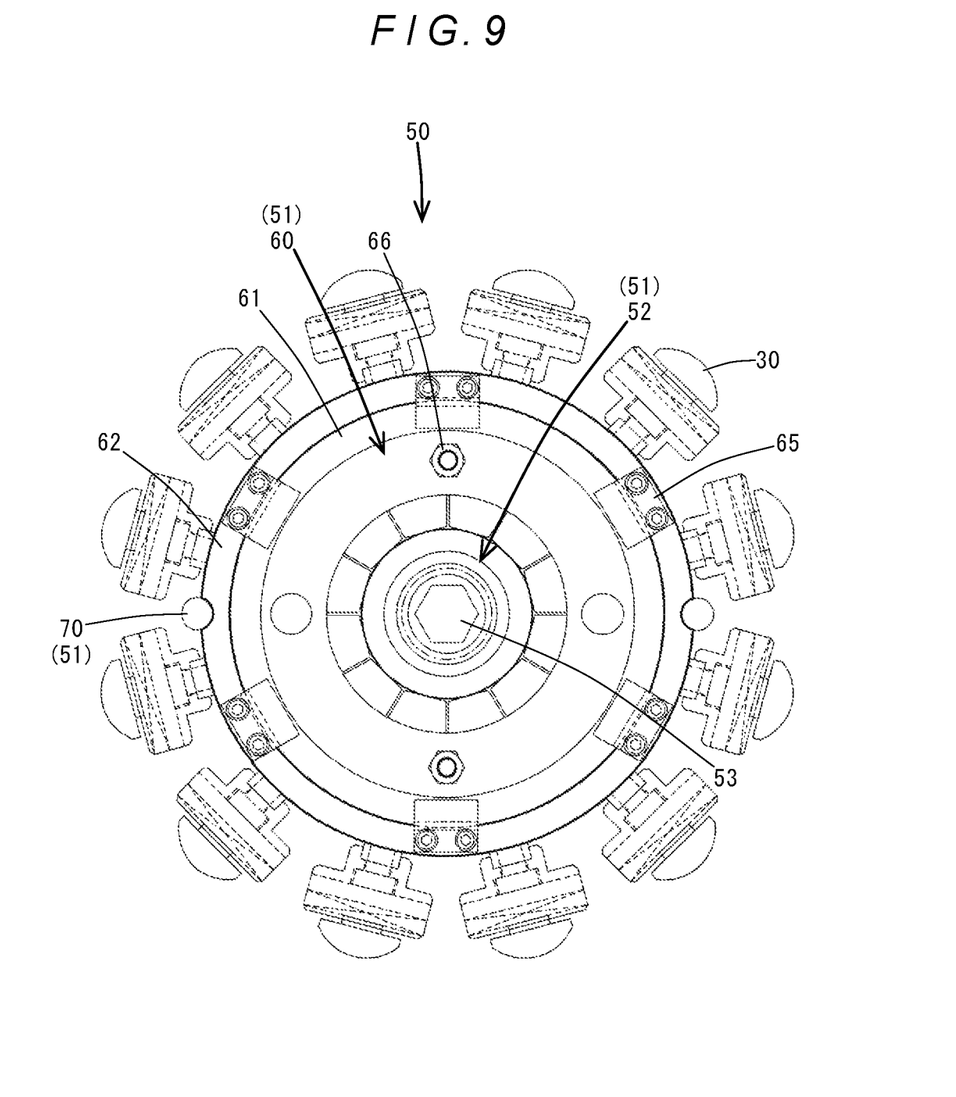
FIG. 9 is a plan view of the damping apparatus shown in FIG. 6.

The moving mechanism 60 is composed of a scroll ring 61, a support ring 62, a moving block 64, a guide block 63, and other components. The scroll ring 61 comprises a ring-shaped member having a scroll groove formed in a lower surface thereof. Further, the support ring 62 has a recess 62a formed in an upper surface thereof for fitting the scroll ring 61 therein, and the support ring 62 is disposed on the support plate 55 to support the scroll ring 61 in such a manner that the scroll ring 61 can be turned around a center axis thereof. Note that a plurality of pressing members 65 fixed to the support plate 55 restrains the scroll ring 61 fitted in the support plate 55 from moving in an upward-downward direction and the scroll ring 61 has a handle 66 provided thereon for an operator to turn the scroll ring 61. Further, the scroll ring 61 is supported by the two auxiliary rods 70 erected on the base plate 81.

The guide block 63 and the moving block 64 each comprise a rectangular member, and two or more pairs (in this embodiment, 12 pairs) of the guide block 63 and moving block 64 are provided radially on the support plate 55. Further, the moving block 64 has a teeth groove formed in an upper surface thereof, the teeth groove meshing with the scroll of the scroll ring 61, and further has a guide groove formed along a longitudinal direction in a lower surface thereof for fitting the guide block 63 therein. Each moving block 64 is disposed with the corresponding guide block 63 fitted in the guide groove thereof and with the teeth groove thereof meshing with the scroll of the scroll ring 61. Note that the support ring 62 has notches formed in portions thereof corresponding to the moving blocks 64.

Further, each of the moving blocks 64 has the damping unit 30 fixed to a radially outer end thereof; therefore, the damping units 30 are provided radially. Note that each damping unit 30 is attached to the moving block 64 by an attachment bolt 35 inserted through the through hole 31f of the holding member 31, with the end of the moving block 64 fitted in the groove 31g formed on the holding member 31 thereof.

Accordingly, in the moving mechanism 60 having the above-described configuration, when the scroll ring 61 is turned using the handle 66, the moving blocks 64 having the teeth grooves meshing with the scroll of the scroll ring 61 and the damping units 30 attached to the moving blocks 64 are moved forward or backward in the radial direction. Note that the moving blocks 64 are previously adjusted to be located at equal positions in the radial direction. Therefore, the damping units 30 are also located at equal positions in the radial direction.

Next, a manner in which vibration of the workpiece W' is damped with the damping apparatus 50 according to this embodiment having the above-described configuration is described. Note that, in this example, as shown in FIGS. 6 and 7, vibration which occurs on the thin-walled workpiece W' having a hollow and cylindrical shape when turning is performed on the workpiece W' is damped, and the workpiece holding device 80 is attached to a spindle of a vertical lathe.

First, the workpiece W' is brought into a state where the damping apparatus 50 is positioned in the internal space of the workpiece W' and the flange portion Wa' of the workpiece W' is fitted in the workpiece holding hole 81*a* of the base plate 81, and then the flange portion Wa' is clamped on the base plate 81 by the presser tools 82. Note that, in this process, the positions of the contact members 33 of the damping units 30 are adjusted by the moving mechanism 60 so as not to be in contact with an inner peripheral surface of the workpiece W'.

Subsequently, the scroll ring 61 is turned in an appropriate direction by operating the handle 66 of the moving mechanism 60, whereby the moving blocks 64 meshing with the scroll ring 61 and the damping units 30 attached to the moving blocks 64 are moved outward in the radial direction to bring the contact members 33 of the damping units 30 into contact with the inner peripheral surface of the workpiece W'. Accordingly, when the contact members 33 are thus pressed on the workpiece W', a resultant reaction force acts on the damping plates 36, and thereby the laminated damping plates 36 are brought into close contact with each other and each of the damping plates 36 is deflected. Note that the contact force of the contact members 33 being in contact with the workpiece W' is adjusted as appropriate by the moving mechanism 60.

Further, the positions of the contact members 33 in the vertical direction for bringing them into contact with the inner peripheral surface of the workpiece W' are adjusted by the position adjusting mechanism 52. That is, the positions of the contact members 33 in the vertical direction for bringing them into contact with the inner peripheral surface of the workpiece W' are adjusted by rotating the screw shaft 53 in the direction to screw it into the nut 54 to move the nut 54, the support plate 55, and the moving mechanism 60 and damping units 30 supported by the support plate 55 upward or rotating the screw shaft 53 in the direction to pull it out of the nut 54 to move the nut 54, the support plate 55, and the moving mechanism 60 and damping units 30 downward.

Accordingly, when turning is performed on an outer peripheral surface of the workpiece W' in this state and vibration (including chatter vibration) occurs on the workpiece W', the vibration is propagated to the damping plates 36 through the contact members 33 and thereby each of the damping plates 36 is vibrated, and, as described above, friction produced between the damping pates 36 reduces and damps the vibration.

Also in this damping apparatus 50, because it has the moving mechanism 60, the contact members 33 can be easily brought into contact with the workpiece W' by a simple operation of operating the moving mechanism 60. Further, the moving mechanism 60 enables the contact force of the contact members 33 being in contact with the workpiece W' to be easily adjusted; therefore, it is possible to optimize the damping effect of the damping apparatus 50 and, if the workpiece W' is easily deflected, the contact force can be easily adjusted to an appropriate one so that deflection of the workpiece W' falls within an allowable range.

Further, also in the damping apparatus 50, because it has the position adjusting mechanism 52, by the position adjusting mechanism 52, the positions of the contact members 33 in the vertical direction for bringing them into contact with the workpiece W' can be easily adjusted to positions which allow the vibration of the workpiece W' to be damped most effectively.

Thus, specific embodiments of the present disclosure have been described above; however, the present disclosure is not limited thereto and can be implemented in other modes.

For example, in the above-described first embodiment, although the moving mechanism 10 and the position adjusting mechanism 20 achieve the above-described effects, they are not necessarily provided and a configuration may be employed in which the damping unit 30 is attached to a right side surface of the support portion 5. In this case, the support base 3 is fixed on the table 40 after the contact member 33 of the damping unit 30 is brought into contact with the workpiece W with an appropriate contact force.

Further, although the holding member 31 has the edge portions 31*a* and 31*a* formed thereon so as to easily hold the damping plates 36, the edge portions 31*a* and 31*a* are not necessarily provided.

Further, the damping units 30 in the above-described embodiments each have the configuration in which the contact member 33 is held by the set of damping plates 36; however, the present disclosure is not limited thereto and a configuration may be employed in which the contact member 33 is attached to the outermost one of the damping plates 36 (for example, by adhesion or welding).

Further, the damping apparatus 50 in the second embodiment has the configuration in which the damping units 30 are disposed to be positioned inside the workpiece W' and the contact members 33 thereof are brought into contact with the inner peripheral surface of the workpiece W'; however, a configuration may be employed in which the damping units 30 are disposed to be positioned outside the workpiece W' and the contact members 33 thereof are brought into contact with the outer peripheral surface of the workpiece W'. In this case, the inner peripheral surface of the workpiece W' is machined.

Further, a film including particulates may be formed on at least a portion of the surface of at least one of the damping plates 36, or alternatively, at least a portion of the surface of at least one of the damping plates 36 may be roughened. These configurations increase friction resistance of the surfaces of the damping plates 36 and therefore improve the vibration damping effect of the damping plates 36.

Further, an adhesive may be at least partially provided between at least some of the damping plates 36. In this configuration, adhesiveness of the adhesive prevents the damping plates 36 from being separated from each other.

Figure 10:
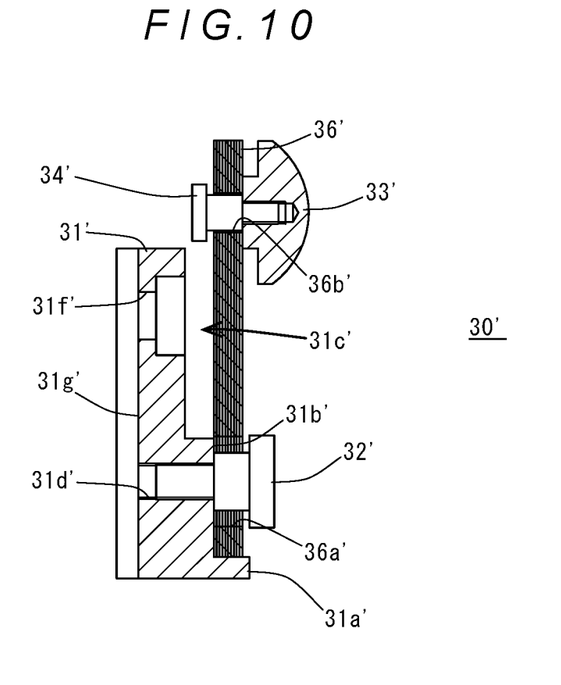
FIG. 10 is a sectional view of a damping unit according to another embodiment of the present disclosure.

Further, in each of the first and second embodiments, the damping unit 30 may be a damping unit 30' having a configuration as shown in FIG. 10. As shown in FIG. 10, the damping unit 30' has a configuration in which one ends of damping plates 36' are held on a holding surface 31*b*' by a holding member 31' and a holding bolt 32' and a contact member 33' is held at the other ends of the damping plates 36'.

The holding bolt 32' is screwed in a screw hole 31*d'* formed in the holding surface 31*b*' of the holding member 31' in a state of being inserted through through holes 36*a*' formed in the damping plates 36', and the contact member 33' is held at the other ends of the damping plates 36' by a holding bolt 34' that is inserted through through holes 36*b*' bored in other end portions of the holding plates 36' and is screwed in the contact member 33'.

Note that, in FIG. 10, the references 31*a*', 31*f*, and 31*g*' indicate an edge portion, a through hole, and a groove, respectively, and correspond to the edge portion 31*a*, the through hole 31*f*, and the groove 31*g* in the above embodiments, respectively.

The damping unit 30' is used instead of the damping unit 30; it is used in a state of being attached to the moving block 27 in the first embodiment or to the moving block 64 in the second embodiment. The damping unit 30' damps vibration of the workpiece W, W' similarly to the damping unit 30.

Further, the contact members 33 and 33' are not limited to the shapes employed in the above embodiments, and a suitable shape can be employed as appropriate in accordance with the shape of an object to be damped or a vibrating manner of the object to be damped. Examples of the shapes of the contact members 33*a* and 33' include a stick-like shape, a semi-cylindrical shape, a cone shape, a bent linear shape, and a shape which can contact with an object at several points.

Further, there is no restriction on the machine tool to which the damping apparatuses 1 and 50 according to the first and second embodiments and the damping units 30 and 30' can be applied. They are applicable to any known machine tool, such as a vertical lathe, a horizontal lathe, a vertical machining center, a horizontal machining center, etc. Further, there is no restriction also on the machining manner to which they can be applied, and they are applicable to, for example, turning, surface machining, chamfering, boring, drilling, etc.

What is claimed is:

1. A damping apparatus damping vibration of an object in a state of being in contact with the object, comprising a plurality of damping units,
   each of the damping units comprising:
      a plurality of damping plates having plasticity;
      a holding member holding at least one ends of the damping plates in a manner to allow deflection of the damping plates, with the damping plates laminated together; and
      a contact member provided at a position spaced from a holding position of the holding member, the contact member being attached to an outermost one of the damping plates or extending through and being held by the damping plates in such a manner that it can be brought into contact with the outermost one of the damping plates and can be moved in an extending direction thereof,
   the damping apparatus further comprising a support mechanism supporting the holding members in such a manner that the contact members can be brought into contact with the object, and
   the support mechanism supporting the damping units in such a manner that the damping units can be moved in a radial direction, and including a moving mechanism moving the damping units forward and backward in the radial direction, and a position adjusting mechanism adjusting a position in a vertical direction for bringing the contact members into contact with the object.

* * * * *